March 24, 1970
C. L. STRYER
3,502,843
ELECTRIC WATER HEATING UNIT
Filed Sept. 30, 1968
2 Sheets-Sheet 1
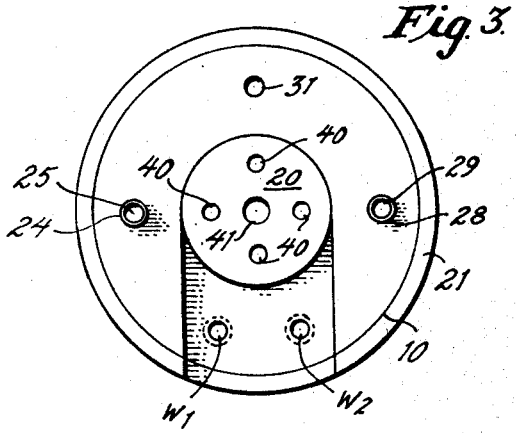
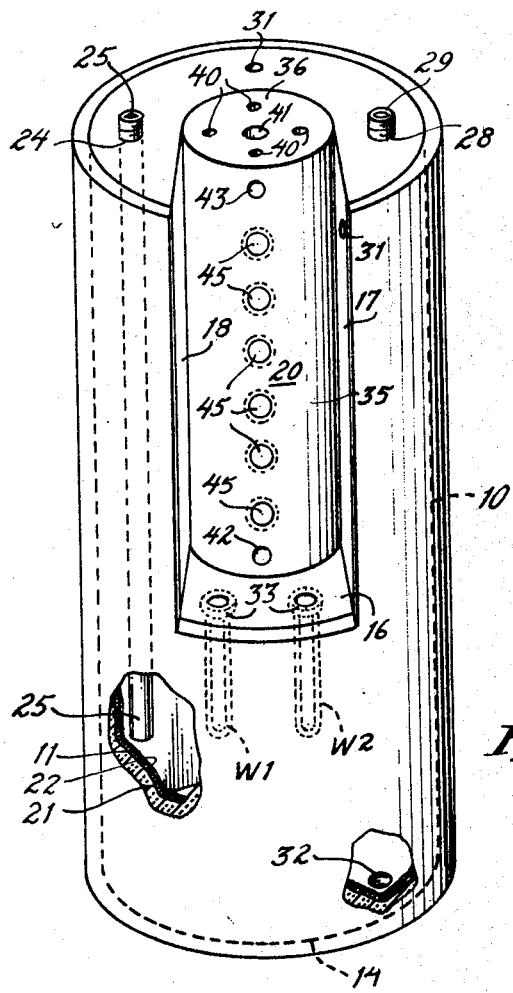
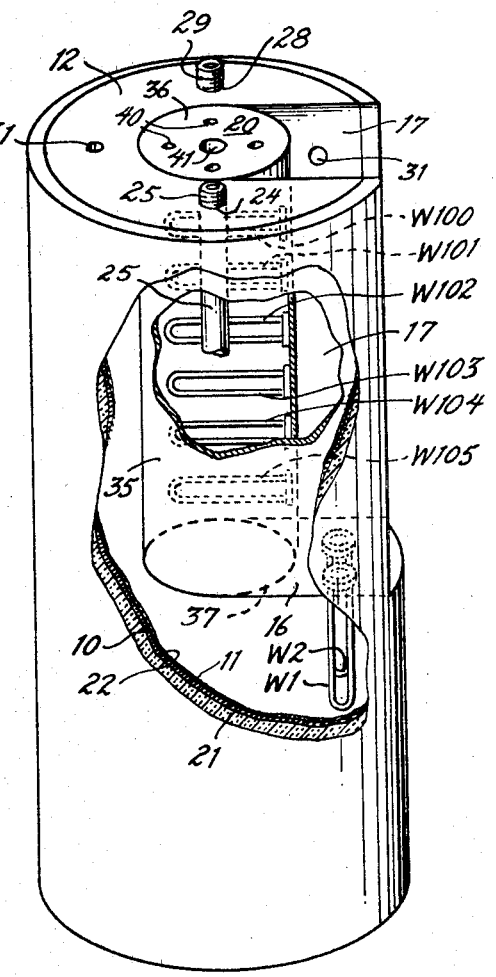
INVENTOR.
CHESTER LEWIS STRYER
BY
ATTORNEY.

INVENTOR.
CHESTER LEWIS STRYER 3,502,843
ELECTRIC WATER HEATING UNIT
Chester Lewis Stryer, Box 271, Emmaus, Pa. 18049
Filed Sept. 30, 1968, Ser. No. 763,529
Int. Cl. F24h 1/18; H05b 1/00
U.S. Cl. 219—312      4 Claims

ABSTRACT OF THE DISCLOSURE

An electric water heating unit with two boilers, one nested within the other, and providing hot water for heating a space and domestic hot water for washing and other purposes. Electrical supply and control units provide complete automatic regulation of the water temperature.

BACKGROUND OF THE INVENTION

Field of the invention

This invention relates to an electric water heating unit which is comprised of two boilers, one nested within the other, and the inner one of which provides hot water for heating a space and the exterior of which provides hot water for domestic use, both boilers may contain electric heating elements which are connected to electrical supply and control circuits for regulating the water temperature.

Description of the prior art

There have been many arrangements of electric heaters disclosed for providing hot water for washing and for heating a space. Most such heaters utilized tanks having plural chambers but none attained the high degree of efficiency required by the cost of electricity. None of the previous tanks provided satisfactory temperature control of the water and they were of complicated construction.

SUMMARY OF THE INVENTION

An electric water heating unit is provided to supply hot water for heating a space and for domestic use which includes a pair of nested boilers with the inner boiler containing a plurality of high voltage heating elements and the exterior one containing fewer or even no elements, all of the elements being connected to electric control circuits for regulation, the result being interchange of heat between the boilers so that little heat is lost and efficient operation attained.

The principal object of the present invention is to provide an electric water heating unit that provides hot water for heating a space and for domestic use.

A further object of the present invention is to provide an electric water heating unit that is simple and inexpensive to construct but sturdy and reliable in operation.

A further object of the present invention is to provide an electric water heating unit that automatically maintains the water temperature for heating and for domestic use.

A further object of the present invention is to provide an electric water heating unit that is economical in operation and has low heat loss.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof in which:

FIGURE 1 is a view in perspective of the heating apparatus in accordance with the invention as seen from the front and being partly broken away to show the interior construction;

FIG. 2 is a view of the heating apparatus shown in FIG. 1 as seen from one side and is also cut away to show the interior construction;

FIG. 3 is a top plan view of the heating apparatus shown in FIG. 1, and

Figure 4:
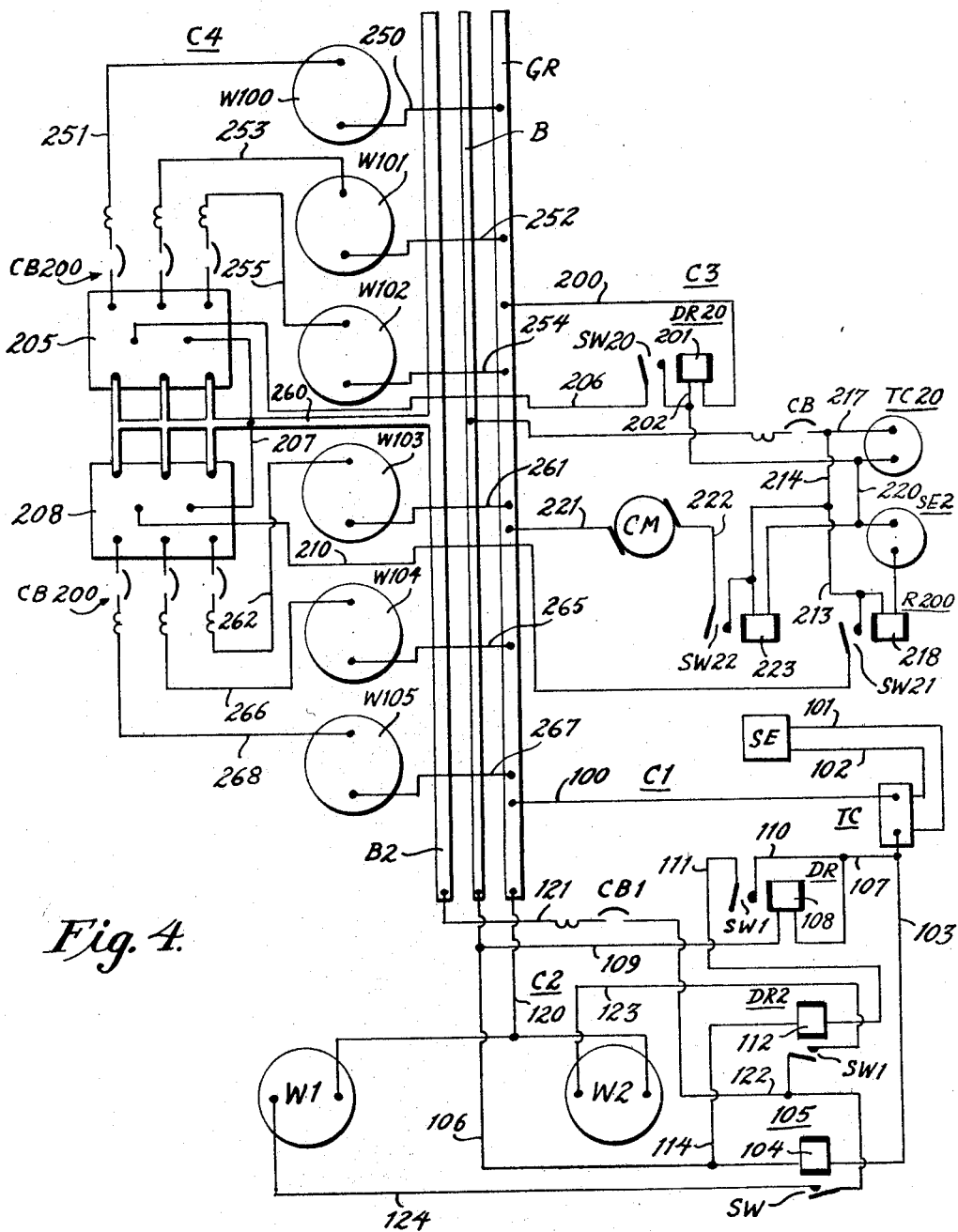
FIG. 4 is a schematic view of the electrical circuits used with the apparatus of the present invention.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the water heating unit in accordance with the invention includes an outer tank or boiler 10 of generally cylindrical shape in cross section and including a wall 11 closed at each end by top and bottom plates 12 and 14 fastened thereto in water tight relation.

Midway the top and bottom plates 12 and 14 a horizontal plate 16 is provided which is connected to the wall 11 and to rearwardly and vertically extending walls 17 and 18. The walls 17 and 18 extend upwardly to top plate 12 to which they are joined and rearwardly to a hollow inner tank or boiler 20 to which they are welded or otherwise fastened to form a water tight seal.

The wall 11 may be provided with an exterior casing or layer 21 of insulation to reduce heat loss which insulation as illustrated is composed of glass fibers but any other suitable insulation may be provided as desired.

The wall 11, plates 12 and 14, and walls 17 and 18 are preferably lined or coated wth a layer 22 of corrosion resistant material for which glass has proven to be highly durable and which is preferred.

The top plate 12 is provided with an inlet hole 24 therein which has a pipe 25 threadably attached thereto and extending downwardly inside of tank 10 to carry the cold water into tank 10 before it mixes with warm water. On the plate 12, and spaced from hole 24, an outlet hole 28 is provided which is threaded for attachment of a pipe 29 to deliver hot water for domestic use such as washing, cooking, and the like. A cold water supply pipe (not shown) and extending to a source of cold water under pressure is connected to the pipe 25.

Other outlet holes 31, normally closed by closure plugs, may be provided for drawing off hot water and are illustrated as being in plates 12 and 17.

A normally plugged drainage hole 32 is provided in bottom plate 14 for cleaning of tank 10 or other purposes as desired.

The wall 16 is provided with two holes 33 therethrough in which two electric resistance heating elements W1 and W2 of well known type may be engaged and project downwardly into the interior of tank 10, to heat the water therein. The elements W1 and W2 in a particular embodiment may be rated at 4500 watts but this may be varied depending on the service required.

The inner tank 20 is preferably of cylindrical configuration in horizontal cross section and includes an outer wall or shell 35, top plate 36 and bottom plate 37. The top plate 36 is fastened to plate 12 and to shell 35 by any suitable means such as welding to form a water tight seal. A bottom plate 37 is fastened to plate 12 and to shell 35 also by welding.

The top plate 36 provided with a plurality of outlet holes 40 therein spaced around plate 36 and with a centrally located outlet hole 41 of somewhat larger diameter than holes 40, all the holes being threaded for the engagement of hot water delivery pipes (not shown) to provide hot water for heating a space such as a building or a part of a building.

The wall or shell 35 has a return water inlet hole 42 at the bottom thereof above plate 37, of larger diameter than holes 40 and threaded for attachment of a return pipe (not shown) which is connected to the system for heating a space.

An additional normally plugged outlet hole 43 may be provided below plate 36 through shell 35 and threaded for pipe engagement.

Spaced between holes 42 and 43, six large diameter holes 45 are provided which have six electric heating resistance elements W100, W101, W102, W103, W104 and W105 engaged therein, extending into the interior of tank 20 for supplying heat to the water container therein.

The elements W100 through W105 in a particular embodiment may be rated at 5000 watts but other differently rated elements can be used as desired and depending on the service demanded of them.

Referring now more particularly to FIG. 4, the electrical circuits which supply electric energy to the heating elements W1, W2 and W100 through W105 are illustrated as four separate circuits C1, C2, C3 and C4.

The circuit C1 is for domestic hot water and provides electricity to the elements W1 and W2 controlled by the circuit C2 in accordance with the temperature of the water contained in tank 10.

The circuit C1 is connected to a common ground or negative buss bar GR by wire 100 which is attached to one side of a temperature control unit TC of common well known type. A temperature sensing element SE is connected to the temperature control TC by wires 101 and 102 and may be placed through one of the holes 40 into tank 10 where it reports the water temperature to control unit TC.

A wire 103 connects the other side of temperature control unit TC to one side of a coil 104 of relay 105. The other side of coil 104 is connected by wire 106 to a hot or positive buss bar B which in the specific illustration is at an electrical potential of 115 volts.

A wire 107 is connected to the wire 103 just after temperature control TC and to one side of a coil 108 of a delay relay DR. A wire 109 connects the other side of coil 108 to wire 106 before positive buss bar B.

A wire 110 is connected to wire 107 and to one side of normally open contacts SW1 which are controlled by coil 108. A wire 111 connects the other side of contacts SW1 to one side of coil 112 of delay relay DR2. The other side of coil 112 is connected by wire 114 to wire 106.

The circuit C2 has a wire 120 connected to the common buss ground bar GR and to one side of each of heating elements W1 and W2. A wire 121 of circuit C2 is connected to the positive buss bar B2 which is illustrated as being at a potential of 230 volts. The wire 121 is connected to an overload circuit breaker CB1. A wire 122 connects the circuit breaker CB1 to normally open contacts SW of delay relay DR2. The contacts SW are activated by the coil 112, and their other side is connected to element W2 by wire 123.

The wire 122 is also connected to contacts SW2 of relay 105 which is controlled by the coil 104 and contacts SW2 are also connected to element W1 by wire 124.

The circuit C3 is the control circuit for elements W100 through W105 and has wire 200 connected to the common ground buss bar GR and to one side of coil 201 of delay relay DR20. The other side of coil 201 is connected to normally open contacts SW20 by wire 202. The contacts SW20 are controlled by coil 201 and connected to one side of relay 205 by wire 206. A wire 207 connects the other side of relay 205 to one side of relay 208 which has wire 210 connected to the other side and to one side of normally open contacts SW21. A wire 213 is connected to the other side of contacts SW21 and to wire 214 which is connected to wire 217 which is connected to buss bar B and to room thermometer TC20.

The wire 213 is also connected to coil 218 of relay R200 which is connected by wire 219 to a temperature sensing element SE2 of well known type which may be inserted in tank 10 in a well known manner. A wire 220 connects sensing element SE2 to wire 202.

A circulator motor and pump unit CM is provided for hot water circulation in the space to be heated and connected to ground buss bar GR by wire 221. A wire 222 connects the other side of unit CM to one side of normally open contacts SW22 the other side of which is connected to wire 214.

The contacts SW22 are controlled by coil 223 of relay R201 which coil 223 is connected to wires 214 and 218 and the energization of which is controlled by room thermometer TC20.

The heating element W100 of circuit C4 is connected by a wire 250 to the ground buss bar GR and to the relay 205 through a circuit breaker CB200 by a wire 251. The heating element W101 is connected to ground bus bar GR by a wire 252 and to the relay 205 through a circuit breaker CB200 by wire 253.

The heating element W102 is connected to the ground buss bar GR by a wire 254 and through a circuit breaker CB200 to relay 205 by a wire 255.

The relay 205 is connected to the positive buss bar B2 by a wire 260 which wire 260 also connects to the relay 208.

The heating element W103 is connected to the ground buss bar GR by a wire 261 and through circuit breaker CB200 to relay 208 by wire 262.

The heating element W104 is connected to ground buss bar GR by wire 265 and through a circuit breaker CB200 to relay 208 by a wire 266.

The heating element W105 is connected to ground buss bar GR by a wire 267 and through circuit breaker CB200 to relay 208 by wire 268.

The mode of operation will now be described.

The boilers 10 and 20 are filled with cold water and the circuits C1, C2, C3 and C4 are available to be energized.

The control circuit C1 is activated by the sensing element SE in the boiler 10 and causes temperature control unit TC to close and activate relay 105 which causes contacts SW2 to close and energize heating element W1. The delay relay coil 108 is energized and causes contacts SW1 to close thereby energizing coil 112 and closing contacts SW1 which completes the unit to energize element W2.

The elements W1 and W2 will heat the water to the degree set by temperature control unit TC and maintain it as required by removal of hot water for use.

The control circuit C3 maintains the temperature in tank 20 by its sensing element SE2 and activates the coil 218 to cause contacts SW21 to close and thereby activate coil 201 of delay relay DR20 to close contacts SW20 and activate relays 205 and 208. The relays 205 and 208 being activated causes electrical energy to flow into elements W100 to W105 thereby heating the water in tank 20. The space temperature control TC20 responds to changes in space temperature and when heat is demanded closes to complete the circuit through coil 223 to close contacts SW22 to energize the circulator unit CM and cause hot water to be circulated in the space to be heated.

The operations above described are repeated as heat is demanded and it is thus apparent that a combined water heating unit suitable for providing hot water for heating a space and domestic use has been provided.

I claim:
1. An electric water heating unit which comprises
   a first tank for providing hot water for domestic use,
   a second tank within said first tank providing hot water for heating, water supply and delivery connections for each of said tanks, at least one electric resistance heating element in said second tank, an electric circuit to provide electrical energy for said heating element in said second tank, and control circuit means associated with said second tank electric circuit, said first tank having an exterior vertical shell with upper and lower end walls and spaced vertical walls extending inwardly from the periphery of said shell and intermediate the ends thereof to provide a space, said second tank being disposed within said space, and having a vertical wall portion in said space, said electric heating element for said second tank being mounted in said wall portion located to be accessible at said space.

2. An electric water heating unit as defined in claim 1, in which the lower part of said space is closed by a horizontal wall spaced above the lower end wall.

3. An electric water heating unit as defined in claim 2, in which an electric heating element for said first tank is carried by said horizontal wall.

4. An electric heating unit as defined in claim 2 in which a water inlet pipe is provided extending downwardly in said first tank to a location below said horizontal wall.

References Cited

UNITED STATES PATENTS

| | | | |
|---|---|---|---|
| 1,028,555 | 6/1912 | Donald | 122—37 |
| 1,040,688 | 10/1912 | Jones | 122—37 |
| 2,373,731 | 4/1945 | Wilson et al. | 122—32 |
| 3,383,495 | 5/1968 | Laube et al. | 219—314 X |

ANTHONY BARTIS, Primary Examiner

C. L. ALBRITTON, Assistant Examiner

U.S. Cl. X.R.

122—37; 219—320, 325, 378; 237—19